United States Patent [19]

Gilead

[11] Patent Number: 4,874,132
[45] Date of Patent: Oct. 17, 1989

[54] DRIP IRRIGATION APPARATUS

[76] Inventor: Gideon Gilead, P.O.B. 26025, Jerusalem, Israel

[21] Appl. No.: 522,728

[22] Filed: Aug. 12, 1983

Related U.S. Application Data

[63] Continuation of Ser. No. 157,838, Jun. 9, 1980, abandoned.

[30] Foreign Application Priority Data

Jun. 19, 1979 [DE] Fed. Rep. of Germany ....... 2924708

[51] Int. Cl.[4] .............................................. B05B 15/00
[52] U.S. Cl. ..................................................... 239/542
[58] Field of Search ...................... 239/542, 547, 1, 11; 138/42, 157; 264/173, 177 R, 146, 177.1

[56] References Cited

U.S. PATENT DOCUMENTS

| | | | |
|---|---|---|---|
| 811,793 | 2/1906 | Reynolds | 264/146 |
| 3,567,134 | 3/1971 | Smith | 239/547 |
| 3,777,987 | 12/1973 | Allport | 239/547 |
| 3,797,754 | 3/1974 | Spencer | 239/542 |
| 3,873,030 | 3/1975 | Barragán . | |
| 3,887,138 | 6/1975 | Gilead . | |
| 3,896,999 | 7/1975 | Barragán . | |
| 4,047,995 | 9/1977 | Leal-Diaz . | |
| 4,053,109 | 10/1977 | Gilead | 239/542 |
| 4,095,618 | 6/1978 | Spencer | 138/118 |
| 4,126,998 | 11/1978 | Gilead . | |
| 4,175,882 | 11/1979 | Gilead . | |
| 4,177,946 | 12/1979 | Sahagun-Barragán | 239/542 |
| 4,195,784 | 4/1980 | Gilead | 239/542 |
| 4,269,357 | 5/1981 | Menzel et al. | 239/542 |

FOREIGN PATENT DOCUMENTS 2643710 3/1978 Fed. Rep. of Germany .

Primary Examiner—Andres Kashnikow
Assistant Examiner—Michael J. Forman

[57] ABSTRACT

Drip irrigation apparatus comprising an elongated element of uniform cross section including an extruded closed portion, the extruded closed portion being embossed to define a pressure reducing pathway. A water supply channel may be formed also by extrusion or by sealing of the edges of the elongated element.

22 Claims, 2 Drawing Sheets

DRIP IRRIGATION APPARATUS

This is a continuation of application Ser. No. 157,838, filed June 9, 1980, abandoned upon the filing hereof.

The present invention relates to irrigation apparatus and more particularly to drip or trickle irrigation.

A great variety of drip irrigation devices are known in the patent literature including in particular a continuous irrigation tube employing a foil element folded longitudinally and so embossed and welded to define a pressure reducing pathway.

Another known device comprises a sleeve-like profile in which the touching longitudinal edges of the sleeve are sealed together by embossing which defines a pressure reducing pathway, the non-embossed cross-section of the sleeve forming a water supply channel.

Various embodiments of drip irrigation apparatus employing thin foils which are embossed and welded together are shown in applicant's U.S. Pat. Nos. 4,175,882, 4,195,784 and 4,126,998 as well as in U.S. Pat. Nos. 3,873,030, 3,896,999 and 4,047,995.

The present invention seeks to improve upon existing drip irrigation apparatus and to provide a drip irrigation device which is relatively simple and economical to produce.

There is thus provided in accordance with an embodiment of the invention drip irrigation apparatus comprising an elongate element of uniform cross section including an an extruded closed portion, the extruded closed portion being embossed to define a pressure reducing pathway.

Further in accordance with an embodiment of the invention the elongate element may also define a water supply channel communicating with the pressure reducing pathway.

A further embodiment of the invention provides extruded strengthened free longitudinal edges which when bonded to a separate sheet define the water supply channel. Further in accordance with this embodiment of the invention, the lower wall of the pressure reducing pathway dividing it from the water flow channel is thinner than the outer walls thus providing automatic pressure adjustment. Rising pressure in the water flow channel pushes the thin wall outwardly reducing the cross section of the pressure reducing pathway and maintaining a constant flow level.

The invention will be more fully understood and appreciated from the following detailed description taken in conjunction with the drawings in which.

Figure 1:
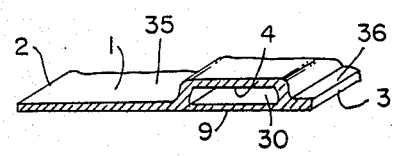
FIG. 1 is a pictorial illustration of an extruded elongate element having a portion with a closed cross section, useful in the invention.
Figure 2:
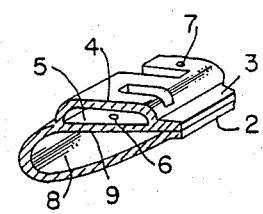
FIG. 2 is a pictorial illustration of drip irrigation apparatus constructed from the elongate element of FIG. 1.

Reference is now made to FIGS. 1 and 2 which illustrate a drip irrigation device constructed and operative in accordance with an embodiment of the present invention and comprising an elongate element 1 typically formed of a thermoplastic material or alternatively formed of any suitable material. The elongate element 1 defines a longitudinal hollow channel 30, of closed cross section and flat portions 35 and 36 disposed on either side thereof intermediate outer longitudinal edges 2 and 3.

It is a particular feature of the present invention that channel 30 is extruded as an integral part of elongate element 1 and is formed with a closed cross section. As seen in FIG. 2, channel 30 is embossed by any suitable conventional or other technique so that parts of its upper and lower walls 4 and 9 are bonded together to provide a raised surface in the unembossed parts which defines a water passage 5 with a multiplicity of bends and turns which cause pressure reduction in water passing therethrough. Such pressure reducing pathways are described inter alia in applicant's earlier U.S. Pat. Nos. 4,175,882 and 4,195,784.

In accordance with this embodiment of the invention, the free longitudinal edges of the profile are bonded together, as seen in FIG. 2, so as to define a water supply channel 8. Water inlets 6 are formed in the bottom wall 9 of the pressure reducing passage 5 to permit the flow of water from channel 8 into passage 5 and water outlets 7 are formed in upper wall 4 of passage 5 to permit the escape of water at reduced pressure from passage 5. The water inlets and outlets may be formed by any suitable technique, such as drilling, punching or laser cutting. The bonding of portions of upper and lower walls 4 and 9 may be effected by any suitable technique such as heat or ultrasonic welding or use of adhesive.

It is a particular feature of the present invention that the wall 9 which divides the water supply channel 8 from the pressure reducing passage 5 is of lesser thickness than the outer walls of the water supply channel 8, thus providing an automatic pressure reducing mechanism. As the pressure increases in the water flow channel 8, the thin wall 9 is pushed outwardly towards wall 4, thereby reducing the cross section of passage 5, so as to maintain a generally constant flow rate through passage 5, notwithstanding the pressure in water supply channel 8.

It is a further particular feature of the present invention that the dividing wall 9 is an integral part of the extruded hollow channel 30 and is inseparable therefrom, thus eliminating the need for any sealed edges therein and substantially reducing the danger of leakage, while permitting relatively thin material to be used in its manufacture.

It is noted that pressure reducing passages 5 are distributed along the length of the water supply channel 8 in a desired arrangement of discrete passages. Each such discrete passage is provided with at least one inlet 6 and at least one outlet 7.

Figure 3:
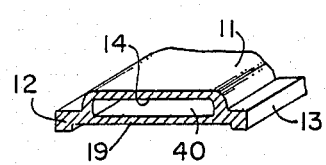
FIGS. 3-5 illustrate respective stages in the manufacture of a drip irrigation device constructed in accordance with an embodiment of the invention.

FIGS. 3-6 illustrate various stages in the production and use of drip irrigation apparatus constructed and operative in accordance with the present invention. In this embodiment, an elongate element 11 is extruded to define a longitudinal hollow channel 40, of closed cross section, having upper and lower walls 14 and 19 respectively and thickened longitudinal edges 12 and 13 which include a flange which extends below the level of lower wall 19. The extruded element with channel 40 is shown in FIG. 3 as it leaves the extruder.

Figure 4:
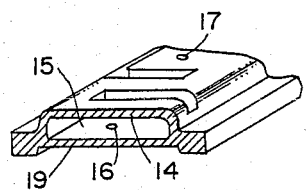

FIG. 4 shows the element of FIG. 3 after it has been embossed and sealed to define a pressure reducing pathway 15. A water inlet 16 and a water outlet 17 have also been provided by suitable aperturing of respective walls 19 and 14.

Figure 5:
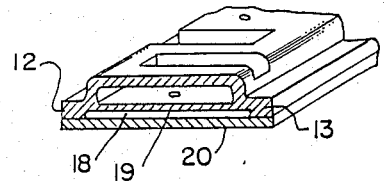

FIG. 5 shows the provision of a water supply channel 18 by sealing an elongate foil 20 along its longitudinal edges to longitudinal edges 12 and 13 of element 11.

Figure 6:
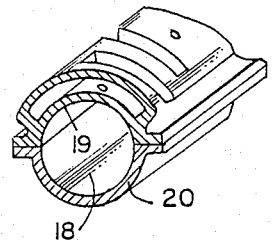
FIG. 6 is a pictorial illustration of the device of FIG. 5 when pressurized.

FIG. 6 shows the apparatus of FIG. 5 in use, where the water pressure in the water supply channel 18 causes it to assume a circular cross section.

Figure 7:
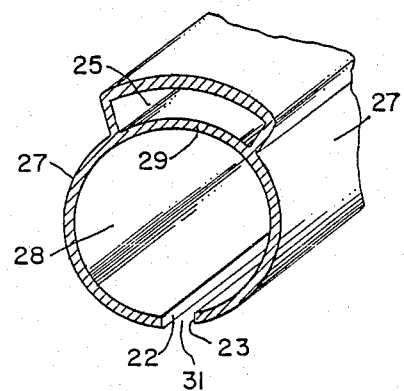
FIG. 7 is a pictorial illustration of an alternative embodiment of the element shown in FIG. 1.

Reference is now made to FIG. 7 which illustrates an alternative embodiment of the invention in which an elongate element 27 is extruded to define a longitudinal hollow channel 25 which is destined, after embossing and sealing to be a pressure reducing passage and a second longitudinal hollow channel 28 which defines a water supply channel. According to one example of this embodiment, channel 28 is extruded to define free longitudinal edges 22 and 23 which define a gap 31 therebetween. Alternatively, channel 28 may be extruded to have a closed cross section, i.e. without free edges 22 and 23.

Depending on the technique that is used to form the inlet apertures communicating between the water supply channel and the various pressure reducing passages, a slit may then have to be formed in channel 28 to permit access to the interior of the channel. If formed, the slit may then be closed by appropriate conventional sealing techniques.

Figure 8:
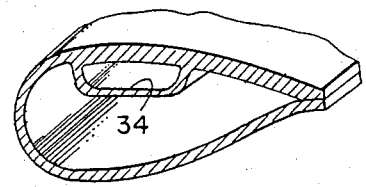
FIGS. 8 and 9 illustrate alternative embodiments of the element illustrated in FIG. 2.
Figure 9:
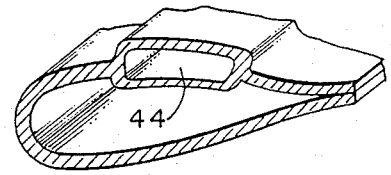

Referring now to FIGS. 8 and 9 which illustrate alternative structures of the type shown in FIGS. 1 and 2, it is seen that FIG. 8 is a folded arrangement in which the corresponding pressure reducing passage is arranged to be interior of the outer wall of the drip irrigation element. In this case wall 34 may be thinner than the remainder of the walls to provide automatic pressure regulation. Such an embodiment provides a relatively smooth exterior surface for the drip irrigation element.

FIG. 9 shows an alternative embodiment in which the corresponding pressure reducing passage 44 is arranged to protrude both inwardly and outwardly of the wall defining the water supply channel.

Figure 10:
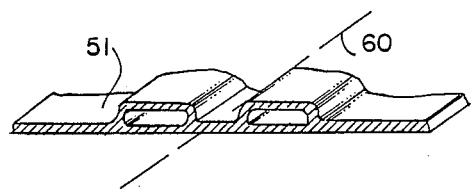
FIG. 10 is a pictorial illustration of an alternative embodiment of the element illustrated in FIG. 1.

FIG. 10 illustrates an alternative embodiment of the structure of FIG. 1 in which the elongate element is formed with a pair of hollow channels of closed cross section arranged in "back to back" arrangement about a longitudinal axis 60. After extrusion, the element may be cut along axis 60 to define two individual elements of the type illustrated in FIG. 1.

Figure 11:
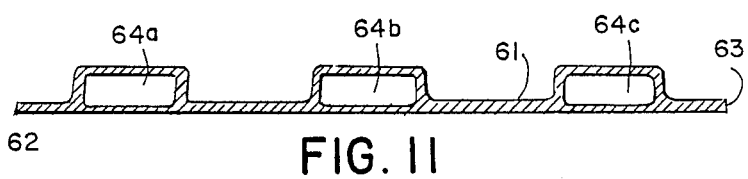
FIG. 11 is a sectional view of a further alternative embodiment of the element illustrated in FIG. 1.
Figure 12:
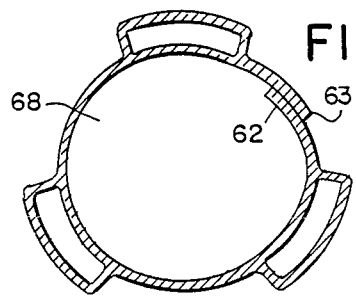
FIG. 12 is a sectional view of a drip irrigation tube formed by folding the embodiment of FIG. 11.

FIGS. 11 and 12 illustrate a further alternative embodiment of the invention in which an elongate element 61 is extruded to define three elongate hollow channels 64a, 64b, and 64c, of closed cross section. The element 61 is arranged such that its longitudinal edges 62 and 63 are sealed in an overlapping orientation to define a water supply channel 68. It may be appreciated that channels 64a-64c are suitably embossed and sealed and suitable inlet and outlet apertures are formed, preferably before sealing of the longitudinal edges.

Figure 13:
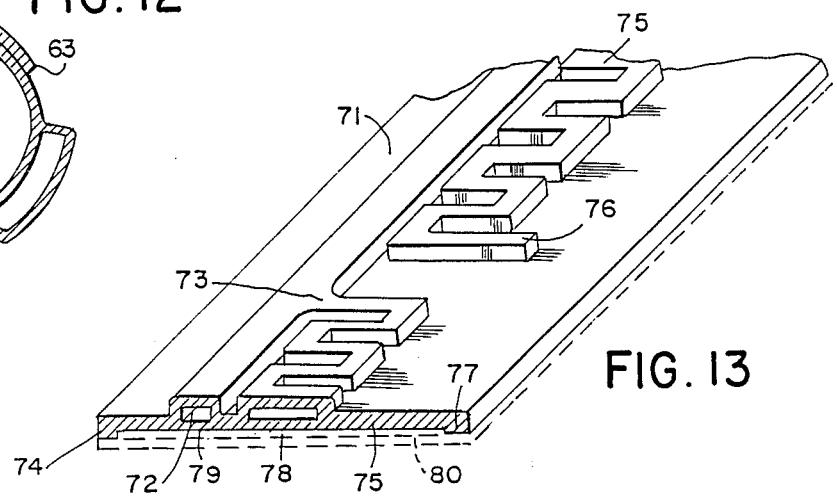
FIGS. 13-15 are illustrations of alternative embodiments of the invention.

FIG. 13 illustrates a further alternative embodiment of the present invention, similar to that illustrated in FIG. 5. This embodiment differs from that illustrated in FIG. 5 in that the longitudinal hollow channel is embossed to provide both a pressure reducing passage 75 and a water distribution channel 72. Water distribution channel 72 communicates with pressure reducing passage 75 via branch outlets 73 and communicates with a water supply conduit 78 via a slit 72a or a series of perforations arranged along an axis 79 underlying distribution channel 72. Water supply conduit 78 is defined by the sealing of a sheet 80 onto the peripheral edges 74 and 77 of the element 71. As illustrated, water outlets from the pressure reducing passage 75 may be defined by slits cut into extended portions 76 of the passage 75. Alternatively any other suitable form of water outlet may be employed.

Figure 14:
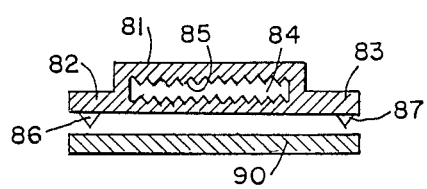

FIG. 14 illustrates a further alternative embodiment of the invention which is similar to that illustrated in FIG. 5 and in which the inner surfaces 85 of a pressure reducing pathway 84 are formed with irregular contours including numerous ridges and depressions transverse to the direction of water throughflow for increasing the pressure reducing efficiency of the passage. These irregularities can be extruded without difficulty at the time the elongate element is produced or formed in any other suitable manner.

FIG. 14 also illustrates another feature of the invention in which the elongate element 81 is formed with pointed ridges 86 and 87 underlying its elongate edges 82 and 83 respectively. These ridges are provided to aid in the welding of a sheet 90 to the elongate edges 82 and 83 by concentrating the welding energy along a narrow axis and thus insuring a high quality seal between the sheet 90 and element 81.

Figure 15:
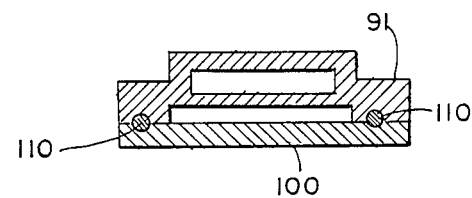

Reference is now made to FIG. 15 which illustrates a further alternative embodiment of the present invention in which a reinforcing wire or thread or other similar element 110 introduced longitudinally between an elongate element 91 and an adjacent sheet 100 which is welded thereto along each of the longitudinal edges thereof. This wire or thread serves to increase the tensile strength of the welded seam and of the entire device. It is appreciated that the wire, thread or similar element can be incorporated in any of the embodiments of the invention described hereinabove and also in any similar drip irrigation device known in the prior art in which it is advisable or desirable to reinforce the longitudinal free edges or add tensile strength.

It will be appreciated by persons skilled in the art that a great number of variations and combinations of constructions can be made on the basis of the examples herein described. Any suitable conventional methods of extrusion, perforation, embossing, sealing or bonding can be used. Normally the formation of water inlets will be accomplished before sealing of the longitudinal free edges, but this need not necessarily be the case. The pressure reducing passage may be formed in any desired configuration. Similarly the wall thickness of the elongate element can be any suitable wall thickness and the different walls may be of any desired relative thickness.

The invention is not limited to what has been particularly shown and described hereinabove. Rather the scope of the present invention is defined only by the claims which follow:

I claim:

1. Drip irrigation apparatus comprising an elongated element of uniform cross-section including:

a seamless leak resistant extruded closed portion defining first and second generally parallel and uniformly spaced main surfaces having a first cross-sectional extent and first and second side surfaces integrally joined to said first and second main surfaces and having a second cross sectional extent less than said first cross sectional extent, said seamless closed portion defining a volume therewithin; and at least one solid portion integrally formed therewith with said seamless closed portion and extending outwardly from at least one of said first and second side surfaces, said elongated element defining parallel side edges, said parallel side edges being joined to define a water supply channel having said extruded closed portion extending only over part thereof, at least one of said first and second main surfaces of said seamless extruded closed portion being embossed thereby defining adjacent portions of said first and second main surfaces at selected locations thereon, said first and second main surfaces being joined to each other at said selected locations at which at least one of said first and second main surfaces are embossed to define a pressure reducing pathway at locations wherein neither of first and second main surfaces are embossed or joined to each other, said pathway having a multiplicity of bends and turns and communicating with said water supply channel;

and also comprising a water outlet permitting exit of water from said pressure reducing pathway.

2. Drip irrigation apparatus according to claim 1 and also comprising an elongate sheet element sealed to said elongated element to define said water supply channel communicating with said pressure reducing pathway.

3. Drip irrigation apparatus according to claim 1 and wherein said elongated element comprises a plurality of extruded closed portions.

4. Drip irrigation apparatus according to claim 3 and wherein one of said plurality of extruded closed portions provides a water supply channel.

5. Drip irrigation apparatus according to claim 3 and wherein said plurality of extruded closed portions each provides, when embossed, a pressure reducing pathway.

6. Drip irrigation apparatus according to claim 1 and wherin said closed portion is also embossed to define a water distribution channel communicating with a plurality of said pressure reducing pathways.

7. Drip irrigation apparatus according to claim 6 and wherein said water distribution channel communicates with a water supply by means of a longitudinal slit underlying said water distribution channel.

8. Drip irrigation apparatus according to claim 6 and wherein said water distribution channel communicates with a water supply by means of a row of perforations underlying said water distribution channel.

9. Drip irrigation apparatus according to claim 1 and wherein said pressure reducing pathway is extruded with inner surfaces of irregular contours for enhanced pressure reduction.

10. Drip irrigation apparatus according to claim 1 and wherein said elongate element is formed with pointed ridges along its free edges to facilitate welding thereof.

11. Drip irrigation apparatus according to claim 1 and wherein said elongate element is provided with at least one reinforcing element extending along a longitudinal axis thereof.

12. Drip irrigation apparatus according to claim 11 and wherein said reinforcing element comprises a wire-like element.

13. Drip irrigation apparatus according to claim 1 and wherein said elongate element is provided with thickened longitudinal edges.

14. Drip irrigation apparatus according to claim 1 and wherein said parallel side edges are sealed to each other to define said water supply channel.

15. Drip irrigation apparatus according to claim 1 and wherein said first and second main surfaces are substantially coextensive.

16. A method for producing drip irrigation apparatus comprising the steps of:

extruding an elongated element of uniform cross section including a seamless portion of closed cross section defining first and second generally parallel and uniformly spaced main surfaces having a first cross sectional extent and first and second side surfaces integrally joined to said first and second main surfaces and having a second cross sectional extent less than said first cross sectional extent, said seamless closed portion defining a volume therewithin and including at least one solid portion integrally formed therewith, said elongated element defining parallel side edges;

embossing said seamless portion of closed cross section forcing portions of said uniformly spaced main surfaces into touching adjacent relationship at selected locations thereof;

fusing said first and second main surfaces at said selected locations to define a pressure reducing pathway intermediate said selected locations and at locations wherein neither of said first and second main surfaces are embossed or joined to each other having a multiplicity of bends and turns;

joining said parallel side edges to define a water supply channel having said extruded closed portion extending only over part thereof;

and also comprising the step of providing a water inlet and a water outlet communicating with said pressure reducing pathway.

17. The method of claim 16 and wherein said joining step also comprises the step of fusing said parallel side edges to each other to define said water supply channel.

18. The method of claim 16 and wherein said joining step also comprises the step of fusing an elongate sheet to the parallel side edges of said elongated element to define said water supply channel.

19. The method of claim 16 and wherein a plurality of elongate elements are formed as a single unit and then slit longitudinally for separation thereof.

20. The method of claim 16 and wherein said extruding step also includes the step of extruding a water distribution channel which communicates with a plurality of pressure reducing pathways.

21. The method of claim 16 wherein said extruding step also includes the step of providing an irregularly contoured high friction surface at the inside of the pressure reducing pathway by extrusion.

22. The method of claim 16 and also comprising the step of sealing embossed portions of said closed portion to define said pressure reducing pathway.

* * * * *